Figure 1:
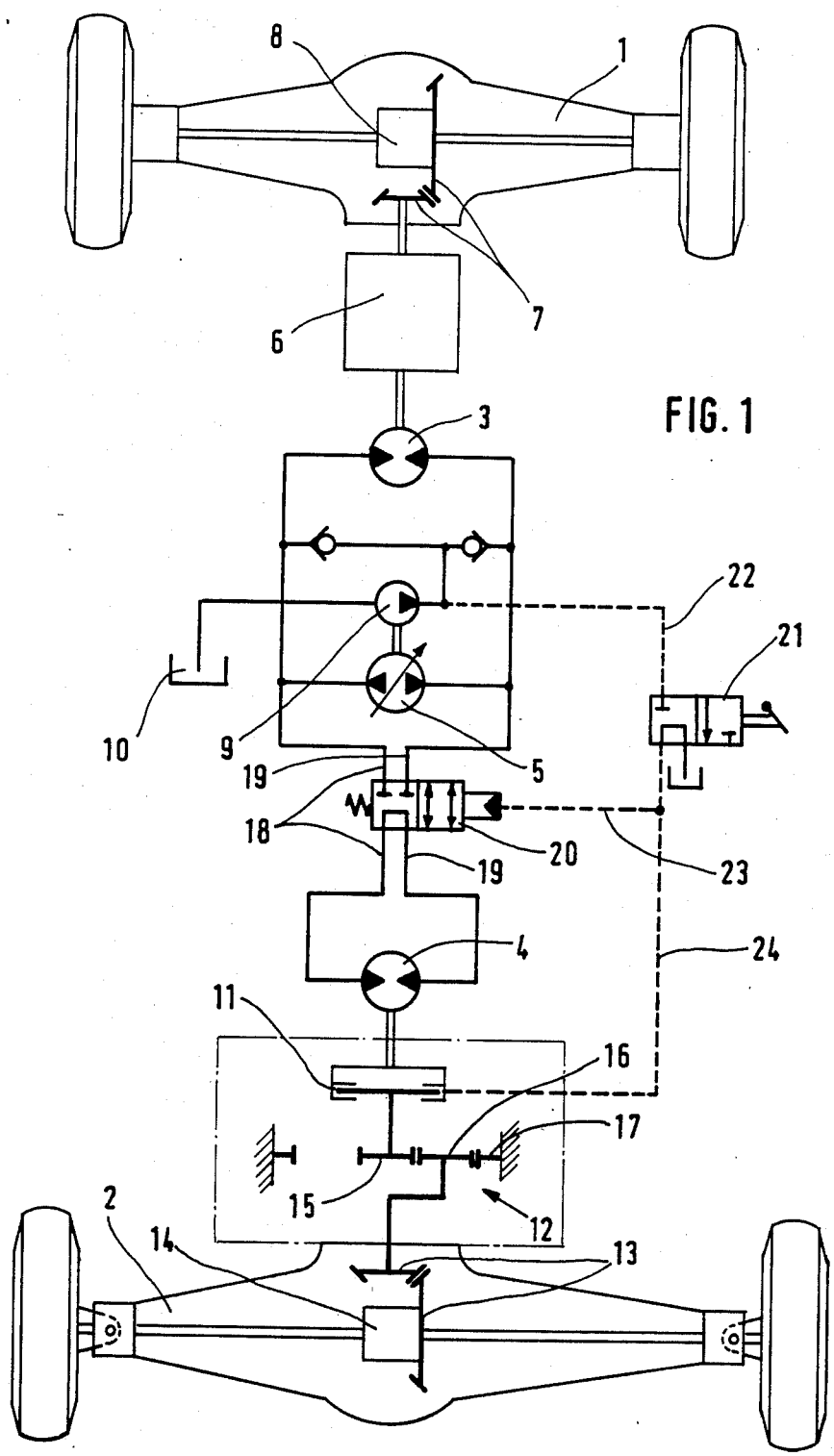

United States Patent [19]

Nembach

[11] Patent Number: 4,667,763
[45] Date of Patent: May 26, 1987

[54] VEHICLE

[75] Inventor: Siegfried Nembach, Immenstaad, Fed. Rep. of Germany

[73] Assignee: Zahnradfabrik Friedrichshafen AG, Friedrichshafen, Fed. Rep. of Germany

[21] Appl. No.: 574,539

[22] Filed: Jan. 27, 1984

[30] Foreign Application Priority Data

Mar. 9, 1983 [DE] Fed. Rep. of Germany ....... 3308295

[51] Int. Cl.⁴ .............................................. B60K 25/04
[52] U.S. Cl. .................... 180/243; 56/11.9; 74/695; 74/705
[58] Field of Search ................. 180/242, 243; 56/11.4, 56/11.8, 11.9, 14.8; 74/695, 705

[56] References Cited

U.S. PATENT DOCUMENTS

| 1,336,131 | 4/1920 | Christie . | |
| 2,728,404 | 12/1955 | Peterson | 180/79.2 |
| 2,750,742 | 6/1956 | Peterson | 60/52 |
| 3,207,254 | 9/1965 | De Venel | 180/79.2 |
| 3,480,100 | 11/1969 | Gaulke | 180/79.2 |
| 3,522,861 | 8/1970 | Middlesworth et al. | 180/243 |
| 3,577,805 | 5/1971 | Ohno et al. | 74/695 |
| 3,736,732 | 6/1973 | Jennings et al. | 56/11.9 |
| 3,833,080 | 9/1974 | Lemmon | 180/79.2 |
| 4,236,595 | 12/1980 | Beck et al. | 180/243 |

FOREIGN PATENT DOCUMENTS

| 948072 | 5/1974 | Canada | 180/242 |
| 1680157 | 12/1971 | Fed. Rep. of Germany | 180/243 |
| 2225257 | 12/1972 | Fed. Rep. of Germany | 180/243 |
| 677038 | 11/1964 | Italy | 180/242 |
| 1219195 | 5/1968 | United Kingdom . | |
| 1237467 | 11/1968 | United Kingdom . | |
| 2005612 | 10/1978 | United Kingdom . | |

Primary Examiner—Carlton R. Croyle
Assistant Examiner—Theodore Olds
Attorney, Agent, or Firm—Hayes, Davis & Soloway

[57] ABSTRACT

A vehicle, in particular an agricultural one, for instance a combine harvester, has two axles (1, 2) drivable from two hydraulic motors (3, 4) switched in parallel, of which the one, non-steerable axle (1) is constantly drivable and the drive of the second steerable axle (2) may be connected or disconnected by means of clutch (11). In order to achieve a compact, stable and vibration-free auxiliary drive of the second steerable axle (2), the clutch (11), a planetary transmission (12) and a bevel drive pinion of an angle transmission (13) are arranged coaxially one behind the other between the associated hydraulic motor (4) and the axle (2). Due to this arrangement the hydraulic motor (4) of the second steerable axle (2) may be approximately half the size of the hydraulic motor (3) of the constantly driven axle (1). The clutch (11) and the planetary transmission (12) are combined to form a compact constructional unit (26) which is flange-connected to the axle housing (27) of the second, steerable axle (2). In the area of the bevel drive pinion of the angle transmission (13) the steering cylinder (28) is integral with the axle housing (27) of the axle (2).

7 Claims, 3 Drawing Figures

VEHICLE

The invention is concerned with a vehicle according to the preamble of claim 1.

With large vehicles, in particular agricultural vehicles, for instance combine harvesters, it is frequently necessary to provide, in addition to the main drive of an axle, an auxiliary drive of a second axle, in order to enable a sufficiently large tractive force to be transmitted in the working range on difficult terrain. A vehicle of this kind with two driven axles is known from the company publication of Messrs. Linde AG, Wiesbaden, special article from: "Linde—Berichte aus Technik und Wissenschaft: Hydrostatische Antribbe fUr Nutzfahrzeuge", LB 202, 22/1966 (Linde Reports from Engineering and Science: Hydrostatic drives for commercial vehicles).

The present invention is based on the requirement to provide a compact, stable and vibration-free auxiliary drive for the working range of such a vehicle, which can be connected and disconnected during driving.

This requirement is met by the features indicated in the characterising part of claim 1. Further advantageous and convenient developments are indicated in the sub-claims. The details shown in the drawings are the subject of the invention.

By arranging a planetary transmission between the angle transmission of the additionally driven axle and the clutch it is possible to provide an additional reduction in the speed of the hydraulic motor. The hydraulic motor of the auxiliary drive may therefore have a high speed and thus a small swept volume. This measure, as well as combining the planetary transmission and the clutch to form a compact constructional unit, reduces the dimensions of the auxiliary drive. And by combining the axle housing of the steerable axle with the steering cylinder another very compact unit is achieved which possesses high stability and high resistance against vibrations.

Figure 2:
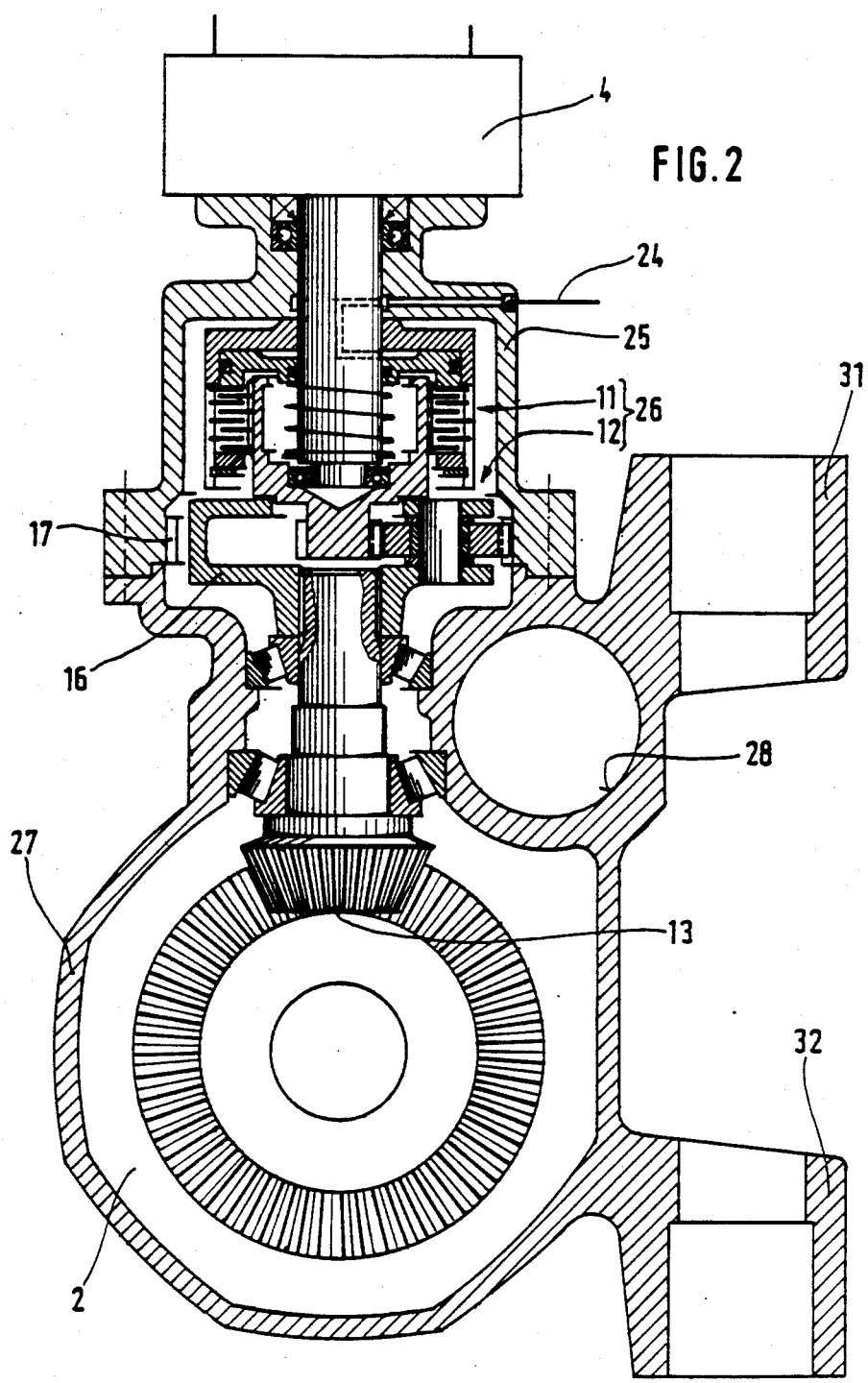

The invention will now be explained by way of an example illustrated in the drawing, in which FIG. 1 shows the schematic layout of the arrangement according to the invention, FIG. 2 shows a longitudinal section through the constructional unit consisting of clutch and planetary transmission with a follow-on cross-section through the second steerable axle.

Figure 3:
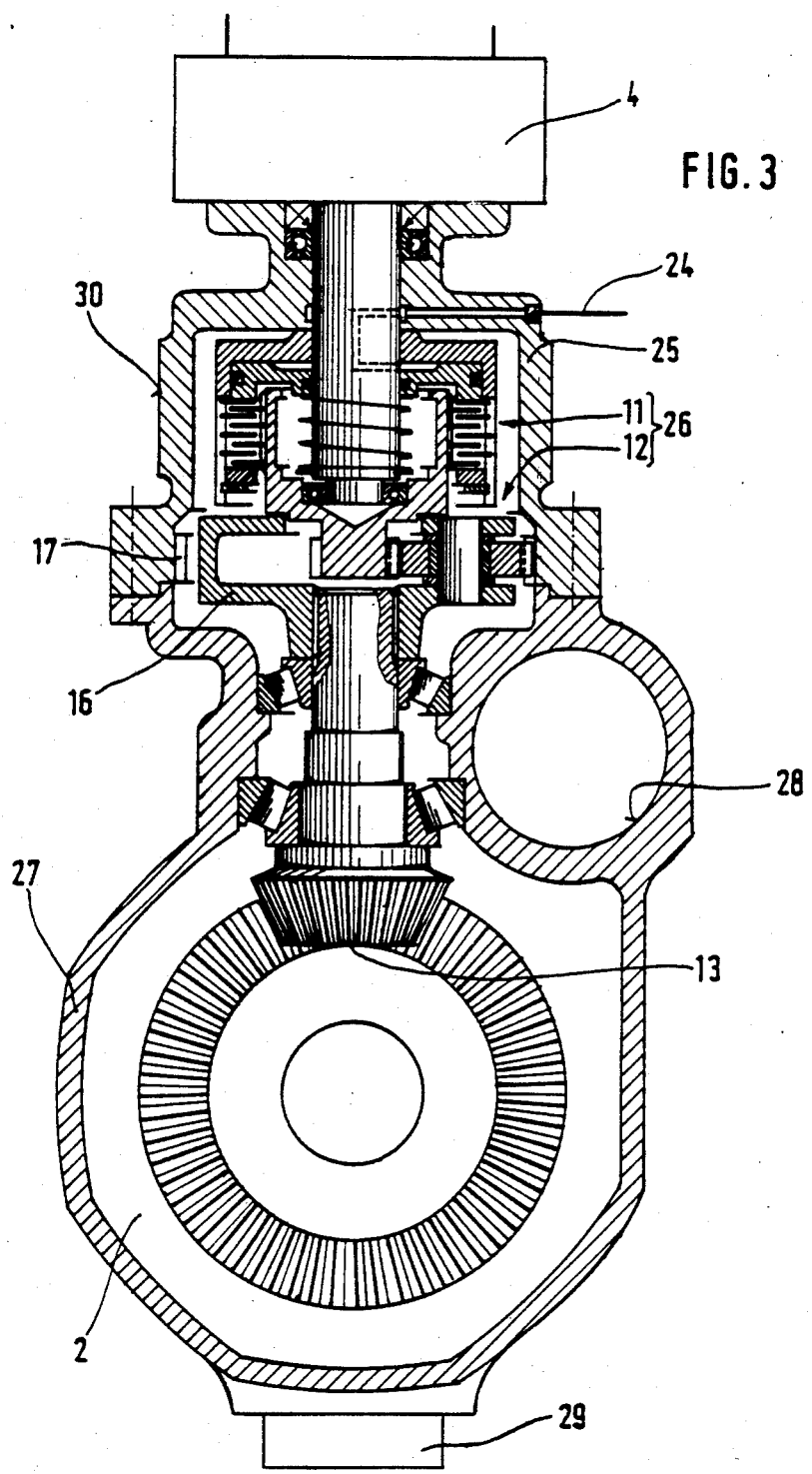

FIG. 3 shows a longitudinal section through the constructional unit consisting of clutch and planetary transmission with a follow-on cross-section through the second steerable axle.

FIG. 1 only shows the two drivable axles 1 and 2 of a vehicle, in particular an agricultural vehicle, for instance a combine harvester. Both axles may be hydrostatically driven by two hydraulic motors 3 and 4 switched in parallel. The two hydraulic motors 3 and 4 are driven from a common hydraulic pump 5 which in FIG. 1 is illustrated as an adjustable pump. The hydraulic motor 3 transmits the driving force via a mechanical transmission 6 and an angle transmission 7 on to the axle 1. A bevel-type differential gear 8 is arranged between the wheels of axle 1. A filler pump 9 serves to compensate for any leakages in the hydrostatic circuit between the hydraulic pump 5 and the hydraulic motors 3 and 4. The filler pump 9 sucks pressure medium from a reservoir 10.

Between the hydraulic motor 4 and the second axle 2, schematically drawn as a steerable axle in FIG. 1, the drive connection is achieved via a clutch 11, a planetary transmission 12 and an angle transmission 13. Between the wheels of axle 2 a bevel-type differential gear 14 is arranged. In the planetary transmission 2 a sun wheel 15 is connected with a section of the clutch 11. A planet carrier 16 is connected with the drive pinion of the angle transmission 13. A hollow wheel 17 is stationary.

A change-over valve 20 designed as a 4/2-way valve is fitted into the hydrostatic lines 18 and 19. In a first position adjustable by a spring the change-over valve blocks the connection between the hydraulic pump 5 and the hydraulic motor 4. In its second switching position this connection is open. The second switching position of the change-over valve 20 is adjustable by the operator of the vehicle via a manual valve lever 21, via which the pressure generated by the filler pump 9 can be supplied to the actuating device of the change-over valve 19. For this purpose a control line 22 originating from the filler pump 9 is connected via the second switching position of the manual valve 21 with a control line 23 of the change-over valve 20. Simultaneously a connection is set up from the filler pump 9 to the clutch 11 via a control line 24. In this way the connection between the hydraulic pump 5 and the hydraulic motor 4 is set up simultaneously with the connection between hydraulic motor 4 and the second axle 2, which connections can be simultaneously disconnected by a corresponding operation of the manual valve 21. Therefore, it is left up to the operator to decide whether to actuate the valve 21 in order to connect or disconnect the additional drive of the guidable axle 2.

The clutch 11 and the planetary transmission 12 are combined in a common housing 25 to form a constructional unit 26. This constructional unit 26 is flanged to the axle housing 27 of axle 2.

In this way the hydraulic motor 4, the clutch 11, the planetary transmission 12 and the bevel drive pinion of the angle transmission 13 are arranged coaxially in relation to each other and in parallel with the longitudinal axis of the vehicle.

In the area of the bevel drive pinion of the angle transmission 13 a steering cylinder 28 integral with the axle housing 27 is arranged in parallel with the axle 2. Arranging the steering cylinder 28 in this way leads to a stiffening of the axle housing 27. Since the steering cylinder 28 is positioned towards the centre of the vehicle (in relation to the longitudinal axis of the vehicle), it is situated in an area protected by the axle.

The axle 2 is conveniently suspended in a self-aligning bearing the axis of which extends parallel to the longitudinal axis of the vehicle. The suspension of axles has for a long time belonged to the prior art and is shown in British Pat. No. 1 478 629, invented by Thomas Eastwood, and PCT International Publication No. WO 82/009828. In FIG. 3 the self-aligning bearing consists of a bearing journal 29 provided in the axle housing 27 in the direction of the axis of the constructional unit 26 and the bevel drive pinion of the angle transmission 13, and of a cylindrical bearing surface 30, which is arranged on the outer circumference of the housing 25 of the constructional unit 26. The bearing journal 29 and the cylindrical bearing surface 30 are shown in FIG. 3 to indicate a first alternative for the pendulum suspension of the axle 2.

A second alternative, FIG. 2, for the pendulum suspension consists in two pillar blocks 31 and 32, which are arranged in the vehicle above the axle 2. The axis of the pillar blocks 31 and 32 is parallel to the axis of the constructional unit 26 consisting of planetary transmission 12 and clutch 11 and thus parallel to the longitudinal axis of the vehicle. The pendulum suspension arranged coaxially to the axis of the constructional unit 26 in the first alternative has the advantage, due to the more compact construction of the auxiliary drive, of leaving more space for other units above this drive.

REFERENCE NUMBERS 1 axle
2 axle
3 hydraulic motor
4 hydraulic motor
5 hydraulic pump
6 mechanical transmission
7 angle transmission
8 bevel-type differential gear
9 filler pump
10 reservoir
11 clutch
12 planetary transmission
13 angle transmission
14 bevel-type differential gear
15 sun wheel
16 planet carrier
17 hollow wheel
18 hydrostatic line
19 hydrostatic line
20 change-over valve
21 manual valve
22 control line
23 control line
24 control line
25 housing
26 constructional unit
27 axle housing
28 steering cylinder
29 bearing journal
30 cylindrical bearing surface
31 pillar block
32 pillar block

I claim:

1. A non-articulated vehicle, in particular an agricultural vehicle with at least two axles driven hydrostatically from two hydraulic motors switched in parallel, of which one axle is constantly drivable and the drive of the second axle may be connected and disconnected by means of a clutch, with an angle transmission arranged between the second axle and the hydraulic motor associated with the second axle, the clutch being arranged in the drive line between the bevel drive pinion of the angle transmission and the hydraulic motor associated with the second axle, characterized in that the drive of the second axle comprises a compact, stable and non-oscillating drive wherein:

the second axle (2) has drivable wheels which are pivoted to provide steering, a planetary transmission (12) is arranged coaxially between the bevel drive pinion of the angle transmission (13) and the clutch (11), a planet carrier (16) of which is non-rotatably connected with the bevel drive pinion, the planetary transmission (12) and the clutch (11) form a contructional unit (26) which may be flange-connected to the axle housing (27) and a steering cylinder (28) formed in the area of the bevel drive pinion integral with the axle housing (27) of the second steerable axle (2) is arranged towards the center of the vehicle in relation to the longitudinal axis of the vehicle.

2. Vehicle according to claim 1, characterised in that the swept volume of the hydraulic motor (4) associated with the second steerable axle (2) is approximately half the swept volume of the hydraulic motor (3) of the constantly drivable axle (1).

3. Vehicle according to claim 1, characterised in that the second steerable axle (2) is suspended in a self-aligning bearing arranged in parallel with the longitudinal axis of the vehicle.

4. Vehicle according to claim 3, characterised in that the axis of the self-aligning bearing (29, 30) is coaxial to the axis of the constructional unit (26) consisting of planetary transmission (12) and clutch (11).

5. Vehicle according to claim 4, characterised in that the axle housing (27) of the second steerable axis (2) has a bearing journal (29) coaxial to the axis of the constructional unit (26) and in that the housing (25) of the constructional unit (26) has a cylindrical bearing surface (30) on its outer circmference for the pendulum suspension.

6. Vehicle according to claim 3, characterised in that the axle housing (27) of the second, steerable axle has two pillar blocks (31, 32) arranged in parallel with the axis of the constructional unit (26).

7. Vehicle according to claim 1, characterised in that a change-over valve (20) is fitted into the hydrostatic lines (18, 19) between hydraulic pump (5) and hydraulic motor (4) associated with the second, steerable axle (2) for the purpose of disconnecting the link from the hydraulic pump (5) to hydraulic motor (4) simultaneously with the clutch (11) arranged between hydraulic motor (4) and planetary transmission (12).

* * * * *